US010834685B1

United States Patent
Singh et al.

(10) Patent No.: US 10,834,685 B1
(45) Date of Patent: Nov. 10, 2020

(54) SYSTEMS AND METHODS FOR ADJUSTING A POWER MISMATCH BETWEEN WIRELESS DEVICES

(71) Applicant: Sprint Spectrum LP, Overland Park, KS (US)

(72) Inventors: Jasinder P. Singh, Olathe, KS (US); Siddharth S. Oroskar, Overland Park, KS (US); Nitesh Manchanda, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 67 days.

(21) Appl. No.: 15/383,264

(22) Filed: Dec. 19, 2016

(51) Int. Cl.
*H04W 52/24* (2009.01)
*H04W 52/36* (2009.01)
*H04L 12/26* (2006.01)

(52) U.S. Cl.
CPC .......... *H04W 52/245* (2013.01); *H04L 43/16* (2013.01); *H04W 52/367* (2013.01)

(58) Field of Classification Search
None
See application file for complete search history.

(56) References Cited

U.S. PATENT DOCUMENTS

| 8,699,391 | B2 | 4/2014 | Yeon et al. | |
|---|---|---|---|---|
| 9,078,264 | B2 | 7/2015 | Han et al. | |
| 2013/0142098 | A1* | 6/2013 | Kwon | H04W 52/04 370/311 |
| 2014/0064253 | A1* | 3/2014 | Deivasigamani | H04W 36/30 370/332 |
| 2014/0200003 | A1* | 7/2014 | Kodali | H04W 36/30 455/436 |
| 2015/0092670 | A1* | 4/2015 | Makhlouf | H04W 52/265 370/329 |

* cited by examiner

*Primary Examiner* — Jason E Mattis
*Assistant Examiner* — Hong Shao

(57) ABSTRACT

Systems and methods are described for configuring a handover threshold for wireless devices in a wireless network. A plurality of wireless devices operating in a radio range of an access node (AN) are instructed to report an actual maximum allowable transmit power value at the AN. The plurality of wireless devices are classified based on the reported actual maximum allowable transmit power value. Handover thresholds for the plurality of wireless devices are configured based on the classification.

16 Claims, 7 Drawing Sheets

US 10,834,685 B1

SYSTEMS AND METHODS FOR ADJUSTING A POWER MISMATCH BETWEEN WIRELESS DEVICES

TECHNICAL BACKGROUND

As wireless networks evolve and grow, there are ongoing challenges associated with reaching targeted coverage levels. Recently, in an effort to boost coverage and enhance throughput in wireless networks, higher power class User Equipment(s) (UEs) and/or wireless devices (HPUEs) have been proposed. Because HPUEs are capable of transmitting at a maximum allowable transmit power that is higher than lower power class UEs and/or wireless devices (LPUEs), there are certain uplink (UL) interference concerns when HPUEs are deployed in areas having an Access Node (AN) density designed for LPUEs. Namely, power mismatches between HPUEs and LPUEs may degrade UL system performance. For example, while deployment of HPUEs within a radio range of ANs designed for LPUEs enhances throughput of HPUEs, it degrades the UL link budget for LPUEs operating within the same radio range due, in part, to overlooked power differences between HPUEs and the LPUEs. In addition, artificial limit(s) assigned to maximum allowable transmit power(s) of HPUEs and/or LPUEs operating within a radio range of the AN based on a power class of the HPUEs and/or LPUEs (e.g., rather than a capability of the HPUE and/or LPUE hardware) causes the HPUEs and/or LPUEs to reach the maximum allowable transmit power(s) before necessary from a range extension perspective.

Overview

Systems and methods are described for configuring handover thresholds in a wireless network. In one instance, a plurality of UEs and/or wireless devices operating in a radio range of an Access Node (AN) are instructed to report a maximum allowable transmit power. The plurality of UEs and/or wireless devices are classified based on the reported maximum allowable transmit power. Handover thresholds may be configured for the plurality of UEs and/or wireless devices based on the maximum allowable transmit power classification.

Alternatively, a power mismatch between a higher power UE and/or wireless device (HPUE) and a lower power UE and/or wireless device (LPUE) may be adjusted. For example, multiple HPUEs and/or LPUEs operating within a radio range of an AN are instructed to report a maximum allowable transmit power. The multiple HPUEs and/or LPUEs are classified as high power wireless devices or low power wireless devices based on the reported maximum allowable transmit power. A power offset can be applied to the maximum allowable transmit power reported by HPUEs and/or LPUEs of the multiple wireless devices classified as high power wireless devices.

Systems and methods are also described for extending a handoff trigger point and/or for configuring handover thresholds for multiple UEs and/or wireless devices. In one embodiment, mobility handoff parameters are set for multiple UEs and/or wireless devices at an AN; the mobility handoff parameters being are set based on maximum allowable transmit power levels reported by multiple UEs and/or wireless devices. The AN can determine that the maximum allowable transmit power level reported by at least one UE and/or wireless device of the multiple UEs and/or wireless devices exceeds a threshold level. An offset can be applied to the maximum allowable transmit power level reported by the at least one UE and/or wireless device.

Alternatively, the AN can detect one or more power class(es) reported by multiple UEs and/or wireless devices operating within a radio range of the AN and instruct the multiple UEs and/or wireless devices to report a maximum allowable transmit power level(s). Based on the reported maximum allowable transmit power level(s), the AN adjusts the reported power class(es) for the multiple UEs and/or wireless devices. Handover thresholds are configured for the multiple UEs and/or wireless devices based on the adjusted power class(es).

In yet another embodiment, systems and methods are described for adjusting a maximum allowable transmit power of one or more UEs and/or wireless devices. For example, a first UE and/or wireless device may experience interference from at least a second UE and/or wireless device (or detect at least a second UE and/or wireless device) reporting a maximum allowable transmit power, which reported maximum allowable transmit power exceeds a threshold level. An AN may detect the interference at the first UE and/or wireless device; the AN can determine a power class of the second UE and/or wireless device based on the reported maximum allowable transmit power. The AN applies an offset to the reported maximum allowable transmit power of the second UE and/or wireless device based on the determined power class.

DETAILED DESCRIPTION

Figure 1A:
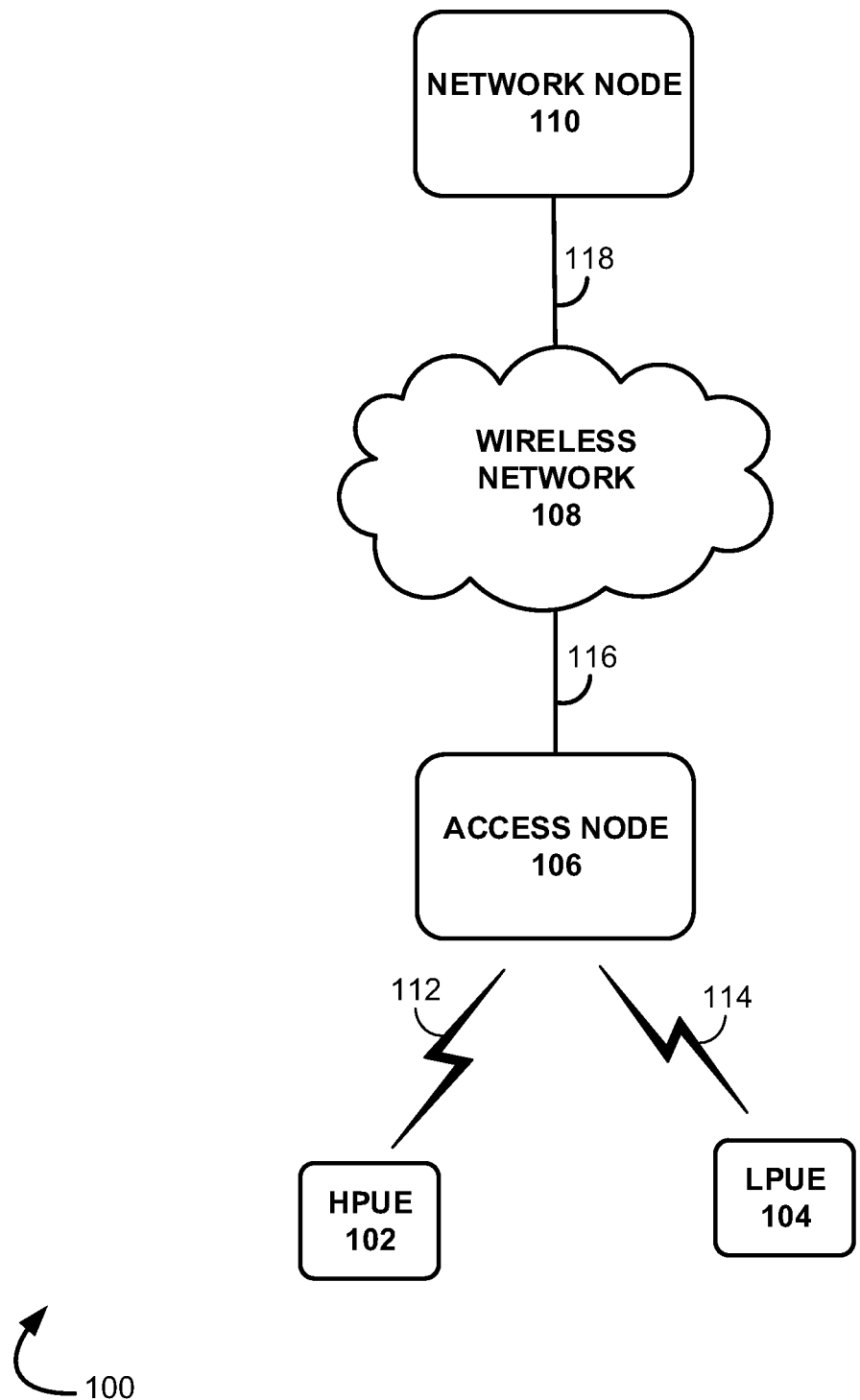
FIG. 1A illustrates an exemplary communication system for adjusting a power mismatch between UEs and/or wireless devices operating in a wireless network.

As wireless networks evolve and grow, there are ongoing challenges associated with reaching targeted coverage levels. While off-the-shelf User Equipment(s) (UEs) and/or wireless devices (LPUEs) are currently capable of transmitting at an artificially configured maximum allowable transmit power (e.g., +23 dBm, illustrated in Table 1 below), in an effort to boost coverage and enhance throughput, network operators have proposed higher power class UEs and/or wireless devices (HPUEs). Because the maximum allowable transmit power level(s) for HPUEs and/or LPUEs is currently defined by the UE and/or wireless device power class, cell-edge UEs and/or wireless devices have a higher probability to be constrained by the artificially configured maximum allowable transmit power owing to the compensation of a large pathloss. When the transmit power of HPUEs and/or LPUEs is artificially constrained, allocating a higher number of physical resource blocks (PRBs) than the HPUE and/or LPUE power capability can afford reduces transmit power to be allocated per PRB, resulting in inefficient use of power resources. In addition, when HPUEs and/or LPUEs are deployed in areas having an Access Node (AN) density designed for LPUEs, there are certain uplink (UL) interference concerns. Namely, power mismatches between HPUEs (e.g., which reach maximum allowable transmit power level(s) before necessary from a range extension perspective) and LPUEs may degrade UL system performance. For example, while deployment of HPUEs within a radio range of ANs designed for LPUEs enhances throughput at the HPUEs, it degrades the UL link budget for LPUEs operating within the same radio range due, in part, to overlooked power differences between the HPUEs and the LPUEs. Cell-edge HPUEs and/or LPUEs transmitting with maximal power can also cause severe inter-cell interference with neighboring ANs. In addition, artificial limit(s) assigned to the maximum allowable transmit power(s) of HPUEs and/or LPUEs (e.g., based on a power class of the HPUE and/or LPUE rather than a hardware capability of the UE and/or wireless device) causes the HPUEs and/or LPUEs to reach the maximum allowable transmit power(s) before necessary from a range extension perspective.

For example, in one embodiment, the maximum allowable transmit power ($P_{cmax}$) level(s) for HPUEs and/or LPUEs are defined by the power class of the UE and/or wireless device, which $P_{cmax}$ level(s) are artificially limited to a predefined level (e.g., +23 dBm) that is below a maximum capability of the HPUE and/or LPUE hardware (i.e., $P_{max}$). For example, as illustrated in Table 1 below, $P_{cmax}$ level(s) and tolerances (i.e., power error limits) with which HPUEs and/or LPUEs can physically transmit data on a given operating band (e.g., Bands I-III) are specified based on defined UE and/or wireless device power classes. While LPUEs are defined as power class 3 or power class 4 UEs and/or wireless devices and are currently capable of transmitting at $P_{cmax}$ level(s) of +23 dBm (e.g., for network operating Bands I-III) with nominal power tolerance(s) of ±2 dB (for E-UTRA bands), HPUEs are defined as power class 1 or power class 2 UEs and/or wireless devices and can transmit at $P_{cmax}$ level(s) of +26 dBm (e.g., for network operating Bands I-III) with nominal power tolerance(s) of ±2 dB (for E-UTRA bands).

TABLE 1

| Oper-ating Band | Power Class 1 HPUE | | Power Class 2 HPUE | | Power Class 3 LPUE | | Power Class 4 LPUE | |
|---|---|---|---|---|---|---|---|---|
| | Power (dBm) | Tol. (dB) | Power (dBm) | Tol. (dB) | Power (dBm) | Tol. (dB) | Power (dBm) | Tol. (dB) |
| Band I | 31 | ±2 | 26 | ±2 | 23 | ±2 | 21 | ±2 |
| Band II | — | — | 26 | ±2 | 23 | ±2 | 21 | ±2 |
| Band III | — | — | — | — | 23 | ±2 | 21 | ±2 |

In one embodiment, HPUEs 102 and/or LPUEs 104 operating within a radio range (i.e., minimum usable signal area) of AN 106 send data on the UL to AN 106 using a Physical Uplink Shared Channel (PUSCH) or other UL channel used to carry signaling messages, Uplink Control Information (UCI), and/or application data; the AN 106 can calculate (periodically or otherwise) a transmit power for the PUSCH or other UL channel. In addition, HPUEs 102 and/or LPUEs 104 can use power headroom report (PHR) and/or enhanced PHR (ePHR) message(s) to report a current transmit power state (e.g., how much power the HPUE 102 and/or LPUE 104 required in a previous subframe structure) at the AN. For example, HPUEs 102 and/or LPUEs use PHR and/or ePHR message(s) to send a calculated (or determined) power headroom (PH) (i.e., a difference between the configured $P_{cmax}$ for the HPUE 102 and/or LPUE 104 and the calculated transmit power of the PUSCH or other channel) to AN 106, which PH has a current range of [−23, 40] dBm with 1-dBm increments and is calculated (or determined) as follows:

$$PH_i = P_{cMAX} - \{10\log_{10}(M_{PUSCH}(i)) + P_{o\_PUSCH}(j) + \alpha(j) \cdot PL + \Delta_{TF}(i) + f(i)\} [dBm],$$

where $P_{cmax}$ is the maximum allowable transmit power of HPUE 102 and/or LPUE 104 (e.g., +23 dBm, +26 dBm, +31 dBm, etc.), $M_{PUSCH}(i)$ is the number of PRBs allocated to HPUE 102 and/or LPUE 104, $P_{o\_PUSCH}(j)$ is the target received power, $\alpha(j)$ is a pathloss compensation factor, and PL is the pathloss between HPUE 102 and/or LPUE 104 and AN 106. $\Delta_{TF}(i)$ and $f(i)$ are parameters that represent an offset associated with, for example, a transport format and a power control adjustment, respectively. AN 106 may use the PHR and/or ePHR message(s) from HPUEs 102 and/or LPUEs 104 to effect link adaptation and/or resource allocation for UL transmissions. The PHR and/or ePHR message(s) can also be used to detect a negative power state of HPUEs 102 and/or LPUEs 104.

Figure 1B:
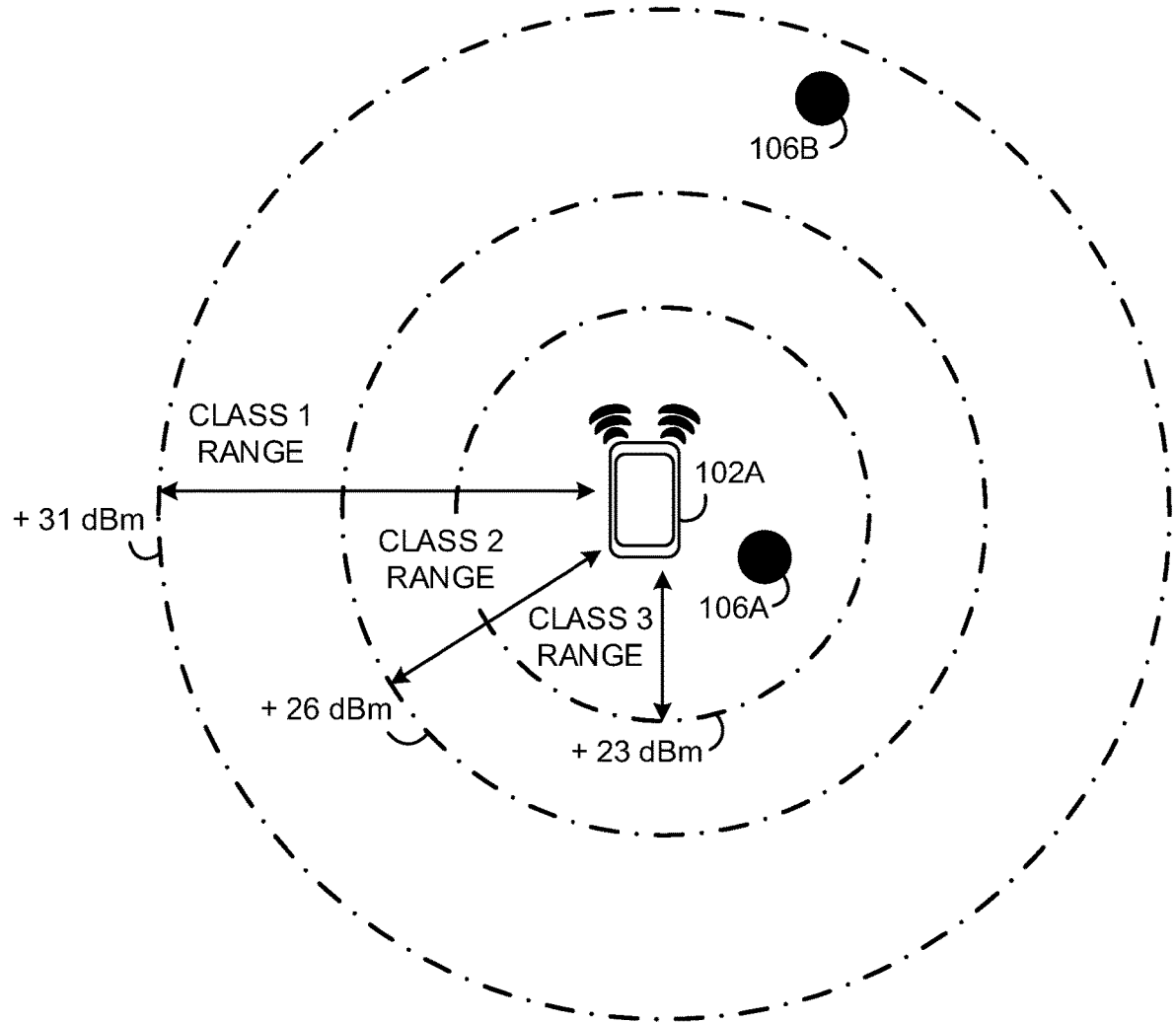
FIG. 1B illustrates exemplary coverage range(s) of HPUEs and LPUEs of the exemplary communication system illustrated in FIG. 1A.

Referring to FIGS. 1A and 1B, in an exemplary embodiment, an UL link budget (e.g., a transmit power of a PUSCH or other UL channel) may be configured at AN 106 based on a negative power error limit (i.e., tolerance) of $P_{cmax}$ level(s) associated with a UE and/or wireless device power class (e.g., power class 1, power class 2, power class 3, power class 4, etc.) reported by HPUEs 102 and/or LPUEs 104 at AN 106, for example, in a UE CAPABILITY message. AN 106 uses the $P_{cmax}$ level(s) and negative power error limits associated with the UE and/or wireless device power class of HPUEs 102 and/or LPUEs 104 reported at AN 106 by HPUEs 102 and/or LPUEs 104 to configure handover thresholds for HPUEs 102 and/or LPUEs 104.

For example, HPUE 102 can use a UE CAPABILITY message to indicate (or report) at AN 106 that HPUE 102 is a power class 2 UE and/or wireless device that corresponds to a $P_{cmax}$ level of +26 dBm (illustrated in Table 1) with a nominal power tolerance (i.e., power error limit) of ±2 dB (e.g., for E-UTRA bands). AN 106 uses the negative power error limit, −2 dB, associated with power class 2 UEs and/or wireless devices to configure a handover threshold for HPUE 102 at +24 dBm; Because the handover threshold for HPUE 102 is configured based on the negative power error limit of −2 dB, HPUE 102 may reach an artificial $P_{cmax}$ before necessary from a range extension perspective.

LPUE 104 uses a UE CAPABILITY message to indicate (or report) its power class at AN 106. For example, LPUE 104 may indicate (or report) that it is a power class 3 UE and/or wireless device at AN 106; Power class 3 UEs and/or wireless devices may correspond to a $P_{cmax}$ level of +23 dBm (illustrated in Table 1) with a nominal power tolerance (i.e., power error limit) of ±2 dB (e.g., for E-UTRA bands). AN 106 uses the negative power error limit, −2 dB, associated with power class 3 UEs and/or wireless devices to configure a handover threshold for LPUE 104 at +21 dBm; Because the handover threshold for LPUE 104 is configured based on the negative power error limit of −2 dB, LPUE 104 may reach an artificial $P_{cmax}$ before necessary from a range extension perspective.

In an exemplary embodiment, illustrated in FIG. 1B, UEs and/or wireless devices 102A operating within a radio range of AN 106A, 106B collect (or detect) an actual $P_{cmax}$ value (e.g., used in calculating PH) associated with the UE and/or wireless device 102A and report the collected (or detected) actual $P_{cmax}$ value at AN 106A and/or AN 106B using a UE CAPABILITY message. For example, UE and/or wireless device 102A may be configured as an HPUE and/or LPUE and can collect (or detect) actual $P_{cmax}$ value(s) such as +24 dBm (e.g., instead of or in conjunction with its HPUE and/or LPUE power class) at AN 106A, 106B. Consequently, AN 106A, 106B receives (and stores at a processing node) multiple actual $P_{cmax}$ value(s) that range from, for example, +21 dBm to +28 dBm, which actual $P_{cmax}$ value(s) include HPUE and/or LPUE defined power classes. AN 106A, 106B configures handover thresholds (e.g., +21-23 dBm, +24-26 dBm, +27-28 dBm, etc.) for UE and/or wireless device 102A based on the actual $P_{cmax}$ value(s) UE and/or wireless device 102A has reported at AN 106, 106B (e.g., rather than based on UE and/or wireless device power class).

For example, as illustrated in FIG. 1B, UEs and/or wireless devices 102A reporting actual $P_{cmax}$ value(s) of +21-23 dBm can include power class 2 HPUEs with a negative power error limit of −2 dB (e.g., UE and/or wireless device with a $P_{cmax}$ value of +25 based on Table 1) and/or power class 3 or 4 LPUEs with a positive power error limit of +2 dB (e.g., UE and/or wireless device with a $P_{cmax}$ value of +21 based on Table 1). Similarly, UEs and/or wireless devices 102A reporting actual $P_{cmax}$ value(s) of +24-26 dBm can include power class 3 LPUEs with a positive power error limit of +2 dB (e.g., UE and/or wireless device with a $P_{cmax}$ value of +22 based on Table 1) and/or power class 1 or 2 HPUEs with a negative power error limit of −2 dB (e.g., UE and/or wireless device with a $P_{cmax}$ value of +27 based on Table 1). UEs and/or wireless devices 102A reporting actual $P_{cmax}$ value(s) of +27-28 dBm can include power class 2 HPUEs with a positive power error limit of +2 dB (e.g., UE and/or wireless device with a $P_{cmax}$ value of +25 based on Table 1) and/or power class 1 HPUEs with a negative power error limit of −2 dB (e.g., UE and/or wireless device with a $P_{cmax}$ value of +30 based on Table 1).

Alternatively, in another exemplary embodiment, HPUEs 102 and/or LPUEs 104 can be configured with a chipset type or version; AN 106 may use the configured chipset type or version of HPUE 102 and/or LPUE 104 (e.g., which may be provided to AN 106 by HPUEs 102 and/or LPUEs 104 during an ATTACH PROCEDURE) to determine the UE and/or wireless device power class of HPUEs 102 and/or LPUEs 104. Based on the chipset classification (i.e., the determined power class of the HPUEs 102 and/or LPUEs 104), AN 106 may determine $P_{cmax}$ value(s) for HPUEs 102 and/or LPUEs 104; AN 106 configures the $P_{cmax}$ value(s) for HPUEs 102 based on the chipset classification. For example, AN 106 may determine that HPUE 102 is a power class 2 UE and/or wireless device with a $P_{cmax}$ value of +26 dBm (illustrated in Table 1); AN 106 may artificially limit the $P_{cmax}$ value for HPUE 102 by applying an offset (e.g., 3 dB) to the $P_{cmax}$ value of +26 dBm to compensate for power mismatches between HPUE 102 and LPUEs 104 operating within the radio range of AN 106.

FIG. 1A illustrates an exemplary communication system 100 for adjusting a power mismatch between UEs and/or wireless devices operating in a wireless network. FIG. 1B illustrates exemplary coverage range(s) of HPUEs and LPUEs of the exemplary communication system 100 illustrated in FIG. 1A. System 100 can comprise HPUEs 102, 102A and/or LPUEs 102A, 104, ANs 106, 106A, 106B, wireless network 108, and network node 110. ANs 106, 106A, 106B can include an inspection module and/or scheduler (not shown). Alternatively, an inspection node and/or scheduler node (not shown) can be included in the backhaul of system 100. The communications between HPUEs 102, 102A and/or LPUEs 102A, 104 and ANs 106, 106A, 106B can be relayed, monitored, inspected, and/or scheduled by the inspection module (or node) and/or scheduler (or node).

Other network elements may be present in the communication system 100 to facilitate communication but are omitted for clarity, such as base stations, base station controllers, gateways, Mobile-Switching-Centers (MSC), Dispatch Application Processors (DAP), and location registers such as a Home Location Register (HLR) or Visitor Location Register (VLR). Furthermore, other network elements may be present to facilitate communication between ANs 106, 106A, 106B and wireless network 108, which are omitted for clarity, including additional processing nodes, routers, gateways, and physical and/or wireless data links for carrying data among the various network elements.

HPUEs 102, 102A and/or LPUEs 102A, 104 can be UEs and/or wireless devices, which can be any device configured to communicate over system 100 using a wireless interface. For example, HPUEs 102, 102A and/or LPUEs 102A, 104 can include a remote terminal unit, a cell phone, a smart phone, a computing platform such as a laptop, palmtop, or a tablet, a Personal Digital Assistant (PDA), or an internet access device, and combinations thereof. The wireless interface of HPUEs 102, 102A and/or LPUEs 102A, 104 can include one or more transceivers for transmitting and receiving data over system 100. Each transceiver can be associated with the same or different frequency bands, the same or different radio access technologies, the same or different network providers, and/or the same or different services. For example, HPUEs 102, 102A and/or LPUEs 102A, 104 can include a transceiver that is associated with one or more of the following: Code Division Multiple Access (CDMA), Global System for Mobile Communications (GSM), Worldwide Interoperability for Microwave Access (WiMAX), Long Term Evolution (LTE), and/or High-Speed Downlink Packet Access (HSDPA), IEEE 802.11, Wireless Fidelity (WiFi), Bluetooth, Zigbee, Infrared Data Association (IrDA), Multimedia Broadcast Multicast Service (MBMS), etc.

HPUEs 102, 102A and/or LPUEs 102A, 104 can be configured as different power class UEs and/or wireless devices. For example, HPUEs 102, 102A and/or LPUEs 102A, 104 can be configured as high power UEs and/or wireless devices or lower power UEs and/or wireless devices (e.g., as illustrated in Table 1, etc.) and are capable of transmitting at varying $P_{cmax}$ level(s) or value(s) such as, for example, +21 dBm, +23 dBm, +26 dBm, +31 dBm, etc. HPUEs 102, 102A and/or LPUEs 102A, 104 can be connected with ANs 106, 106A, 106B through communication links 112, 114 (illustrated in FIG. 1A). Links 112, 114 can use various communication media, such as air, space, metal, optical fiber, or some other signal propagation path—including combinations thereof. Links 112, 114 may comprise many different signals sharing the same link. Links 112, 114 could include multiple signals operating in a single "airpath" comprising beacon signals, user communications, communication sessions, overhead communications, frequencies, timeslots, transportation ports, logical transportation links, network sockets, packets, or communication directions. For example, user communication between HPUEs 102, 102A and/or LPUEs 102A, 104 and ANs 106, 106A, 106B could share the same representative wireless link, but be transferred over different communication sessions, frequencies, timeslots, packets, ports, sockets, logical transport links, or in different directions—including combinations thereof.

HPUEs 102, 102A and/or LPUEs 102A, 104 can transmit and/or receive information over system 100 using various communication services. These services can include various voice, data, and/or MBMS services and applications. For example, mobile voice services, mobile data services, Push-to-Talk (PTT) services, internet services, web browsing, email, pictures, picture messaging, video, video messaging, broadcast video, audio, voicemail, music, MP3's, ring tones, stock tickers, new alerts, etc.

ANs 106, 106A, 106B can be any network node configured to provide communication between HPUEs 102, 102A and/or LPUEs 102A, 104 and wireless network 108. ANs 106, 106A, 106B can be short-range ANs or standard ANs. A short-range AN could include a microcell base station, a picocell base station, a femtocell base station, a Remote Radio Head (RRH), relay node, or other low power AN; a standard AN could include a base transceiver station, a radio base station, an eNodeB device, or an enhanced eNodeB device, a Donor eNodeB or the like. ANs 106, 106A, 106B can communicate scheduling decisions (e.g., DL scheduling assignments) to HPUEs 102, 102A and/or LPUEs 102A, 104 using Downlink Control Information (DCI) carried by a Downlink Control Channel (PDCCH). The DCI DL scheduling assignments may include, for example, Physical Downlink Shared Channel (PDSCH) resource indication, a transport format, hybrid-ARQ information, control information (e.g., related to multiplexing), command for power control of the Physical Uplink Control Channel (PUCCH), uplink scheduling grants, PUSCH resource indication, transport format (e.g., an index of MCS, which may be QPSK, QAM16, QAM64, etc.), etc.

ANs 106, 106A, 106B can comprise a processor and associated circuitry to execute or direct the execution of computer-readable instructions to obtain information. ANs 106, 106A, 106B can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. ANs 106, 106A, 106B can receive instructions and other input at a user interface.

Wireless network 108 can be a wired and/or wireless communication network, and can comprise processing nodes, routers, gateways, and physical and/or wireless data links for carrying data among various network elements, including combinations thereof, and can include a Local Area Network (LAN), a Wide Area Network (WAN), and an internetwork (including the Internet). Communication network 110 can be capable of carrying data, for example, to support voice, PTT, broadcast video, and data communications by a wireless device, for example, HPUEs 102, 102A and/or LPUEs 102A, 104. Wireless network protocols can comprise CDMA 1×RTT, GSM, Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and WiMAX. Wired network protocols that may be utilized by wireless network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network 108 can also comprise additional base stations, controller nodes, telephony switches, internet routers, network gateways, computer systems, communication links, or some other type of communication equipment, and combinations thereof.

Network node 110 can be any network node configured to communicate information and/or control information over system 100. For example, network node 110 can receive information from or transmit information to HPUEs 102, 102A and/or LPUEs 102A, 104 over system 100. For ease of illustration, network node 110 is shown to be located in the backhaul of system 100. However, network node 110 could alternatively be located between ANs 106, 106A, 106B and wireless network 108. Network node 110 can be a stand-alone computing device, computing system, or network component, and can be accessible, for example, by a wired or wireless connection, or through an indirect connection such as through a computer network or wireless network. For example, network node 110 can include a Mobility Management Entity (MME), a Home Subscriber Server (HSS), a Policy Control and Charging Rules Function (PCRF), an Authentication, Authorization, and Accounting (AAA) node, a Rights Management Server (RMS), a Subscriber Provisioning Server (SPS), a policy server, etc. One of ordinary skill in the art would recognize that network node 110 is not limited to any specific technology architecture, such as LTE, and can be used with any network architecture and/or protocol.

Communication links 112, 114, 116, 118 can be wired or wireless and use various communication protocols such as Internet, Internet Protocol (IP), LAN, optical networking, Hybrid Fiber Coax (HFC), telephony, Ti, or some other communication format—including combinations, improvements, or variations thereof. Wireless communication links can be a Radio Frequency (RF), microwave, infrared, or other similar signal, and can use a suitable communication protocol, for example, GSM, CDMA, WiMAX, or LTE, or combinations thereof. Other wireless protocols can also be used. Links 112, 114, 116, 118 can be direct link or might include various equipment, intermediate components, systems, and networks.

Figure 2:
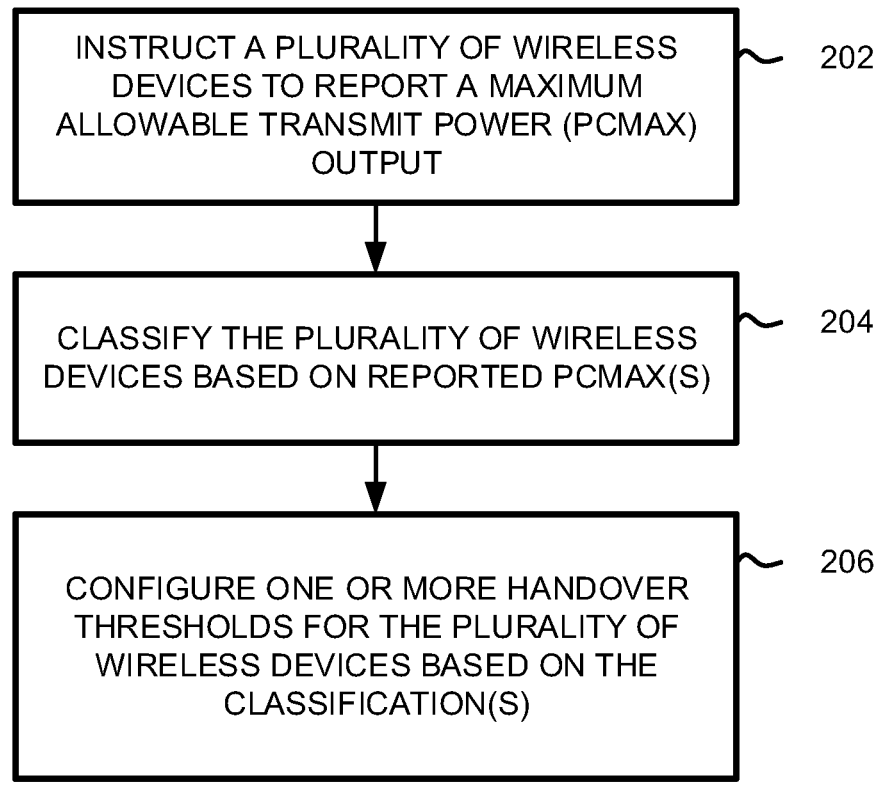
FIG. 2 illustrates a flow chart of an exemplary method for configuring an UL link budget for HPUEs and/or LPUEs operating in a wireless network.

FIG. 2 illustrates a flow chart of an exemplary method for optimizing an UL link budget for HPUEs and/or LPUEs operating in a wireless network. The method of FIG. 2 will be discussed with reference to the exemplary system 100 illustrated in FIG. 1A and the exemplary coverage range(s) of HPUEs and LPUEs illustrated in FIG. 1B. But, the method for optimizing an UL link budget for HPUEs and/or LPUEs illustrated in FIG. 2 can be implemented with any suitable communication system. In addition, although FIG. 2 depicts steps performed in a particular order for purposes of illustration and discussion, the method discussed herein is not limited to any particular order or arrangement. One skilled in the art, using the disclosure provided herein, will appreciate that various steps of the method can be omitted, rearranged, combined, and/or adapted in various ways.

UEs and/or wireless devices are configured such that they operate in a connected mode within a radio range of AN(s). While off-the-shelf UEs and/or wireless devices (LPUEs) currently transmit at $P_{cmax}$ level(s) or value(s) of +23 dBm, higher power class UEs and/or wireless devices (HPUEs) capable of transmitting at $P_{cmax}$ level(s) or value(s) of +31 dBm are proposed. Because the $P_{cmax}$ level(s) or value(s) for HPUEs and/or LPUEs are defined by UE and/or wireless device power class, the $P_{cmax}$ level(s) or value(s) can be artificially limited to predefined levels below a maximum capability of the HPUE and/or LPUE hardware ($P_{max}$). For example, $P_{cmax}$ level(s) or value(s) for HPUEs and/or LPUEs may be artificially limited based on a negative power error limit (or tolerance) of the UE and/or wireless device power class of the HPUE and/or LPUE reported at the AN. Because handover thresholds for HPUEs and/or LPUEs are configured based on the artificially limited $P_{cmax}$ level(s) or value(s), HPUEs and/or LPUEs operating within a radio range of the AN reach $P_{cmax}$ level(s) or value(s) before necessary from a range extension perspective.

Referring to FIG. 2, at 202, AN 106 instructs a plurality of UEs and/or wireless devices configured as HPUEs 102 and/or LPUEs 104 to report an actual $P_{cmax}$ level(s) or value(s) at AN 106. For example, in an exemplary embodiment, HPUE 102 and/or LPUE 104 can operate in a radio range of AN 106; HPUE 102 and/or LPUE 104 can collect (or detect) data associated with an actual $P_{cmax}$ level(s) or value(s) of the HPUE 102 and/or LPUE 104 at, for example, a processing node of the HPUE 102 and/or LPUE 104. HPUE 102 and/or LPUE 104 may report the collected (or detected) actual $P_{cmax}$ level(s) or value(s) at AN 106 via a PHR and/or ePHR message or a UE CAPABILITY message.

For example, HPUE 102 may be classified as a power class 2 UE and/or wireless device; the $P_{cmax}$ level(s) or value(s) for HPUE 102 can be artificially limited to +24 dBm (e.g., power class 2 UEs and/or wireless devices have defined $P_{cmax}$ level or value of +26 dBm, which $P_{cmax}$ level or value is configured based on a negative power error limit of −2 dB). Instead of (or in addition to) reporting its UE and/or wireless device power class at AN 106, HPUE 102 reports its actual $P_{cmax}$ level(s) or value(s) of, for example, +25 dBm, at AN 106. LPUE 104 may be classified as a power class 3 UE and/or wireless device; the $P_{cmax}$ level(s) or value(s) for LPUE 104 can be artificially limited to +21 dBm (e.g., power class 3 UEs and/or wireless devices have defined $P_{cmax}$ level or value of +23 dBm, which $P_{cmax}$ level or value is configured based on a negative power error limit of −2 dB). Instead of (or in addition to) reporting its UE and/or wireless device power class at AN 106, LPUE 104 reports its actual $P_{cmax}$ level(s) or value(s) of, for example, +24 dBm, at AN 106. Thus, AN 106 includes a mix of HPUEs 102 and/or LPUEs 104 with actual $P_{cmax}$ level(s) or value(s) of, for example, +21 dBm to +28 dBm (e.g., assuming AN 106 is serving power class 2 and 3 UEs and/or wireless devices).

At 204, AN 106 classifies the HPUEs 102 and/or LPUEs 104 based on the actual $P_{cmax}$ level(s) or value(s) reported at AN 106. For example, in an exemplary embodiment, AN 106 can distinguish (or classify) HPUEs 102 and/or LPUEs 104 into different predefined categories (e.g., +21-23 dBm, +24-26 dBm, and/or +27-28 dBm UEs and/or wireless devices) based on the actual $P_{cmax}$ level(s) or value(s) reported by HPUE 102 and/or LPUE 104 at AN 106.

At 206, AN 106 configures handover thresholds for the HPUEs 102 and/or LPUEs 104 based the classification category (e.g., +21-23 dBm, +24-26 dBm, and/or +27-28 dBm UEs and/or wireless devices) of HPUE 102 and/or LPUE 104. For example, HPUE 102 and/or LPUE 104 reporting actual $P_{cmax}$ level(s) or value(s) of +25 and +24, respectively, can both be classified in the predefined category of +24-26 dBm UEs and/or wireless devices. AN 106 may configure handover thresholds for HPUE 102 and/or LPUE 104 based on the predefined category of +24-26 dBm UEs and/or wireless devices rather than the defined power class (and negative tolerance) associated with the power class of HPUE 102 and/or LPUE 104.

Figure 3:
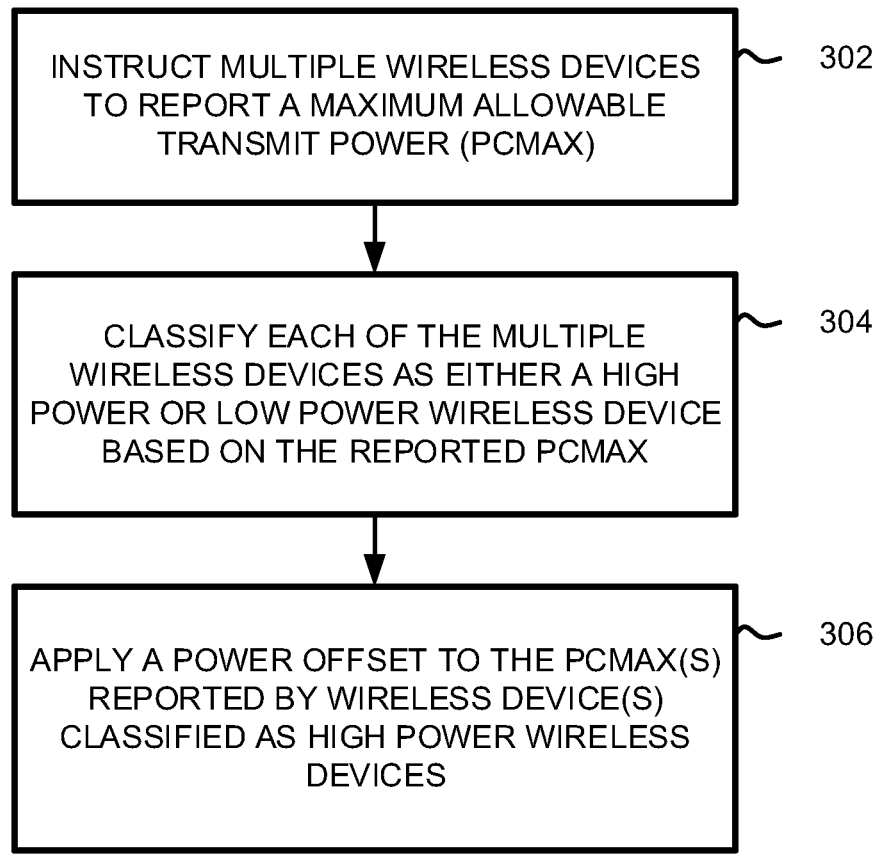
FIG. 3 illustrates another flow chart of an exemplary method for configuring a handover threshold for HPUEs and LPUEs operating in a wireless network based on a determined power mismatch.

FIG. 3 illustrates a flow chart of an exemplary method for adjusting a power mismatch between HPUEs and/or LPUEs operating in a wireless network. The method of FIG. 3 will be discussed with reference to the exemplary system 100 illustrated in FIG. 1A and the exemplary coverage range(s) of HPUEs and LPUEs illustrated in FIG. 1B. But, the method for adjusting a power mismatch between HPUEs and/or LPUEs illustrated in FIG. 3 can be implemented with any suitable communication system. In addition, although FIG. 3 depicts steps performed in a particular order for purposes of illustration and discussion, the method discussed herein is not limited to any particular order or arrangement. One skilled in the art, using the disclosure provided herein, will appreciate that various steps of the method can be omitted, rearranged, combined, and/or adapted in various ways.

UEs and/or wireless devices are configured such that they operate in a connected mode within a radio range of AN(s). LPUEs are currently capable of transmitting at $P_{cmax}$ level(s) or value(s) of +23 dBm; HPUEs that transmit at $P_{cmax}$ level(s) or value(s) of +31 dBm have been proposed to boost coverage in rural deployments and to enhance throughput in suburban/urban environments. But, when HPUEs are deployed in areas with an AN density designed for LPUEs, there are certain UL interference concerns. Namely, power mismatches between HPUEs (e.g., which reach $P_{cmax}$ level(s) or value(s) before necessary from a range extension perspective) and LPUEs may degrade UL system performance for the LPUEs. For example, while deployment of HPUEs within a radio range of ANs designed for LPUEs enhances throughput at the HPUEs, it degrades the UL link budget for LPUEs operating within the same radio range due, in part, to overlooked power differences between the HPUEs and/or LPUEs.

Referring to FIG. 3, at 302, AN 106 instructs multiple wireless devices and/or UEs configured as HPUEs 102 and/or LPUEs 104 to report an $P_{cmax}$ level(s) or value(s) at AN 106 via a PHR and/or ePHR message or a UE CAPABILITY message; HPUEs 102 and/or LPUEs 104 may also be configured with a chipset type and/or version (e.g., which may be provided to AN 106 by HPUEs 102 and/or LPUEs 104 during an ATTACH PROCEDURE).

In one embodiment, AN 106 may detect a UE and/or wireless capability of HPUEs 102 and/or LPUEs 104 to transmit above a $P_{cmax}$ level(s) or value(s) known at AN 106; the PHR and/or ePHR may be higher than required due the calculated transmit power of the PUSCH or other channel being configured for LPUEs. Thus, it may be desirable to determine (or detect) the UE and/or wireless device power class for HPUEs 102 and/or LPUEs 104 based on the configured chipset type and/or version of the HPUEs 102 and/or LPUEs 104 provided at AN 106 during the ATTACH PROCEDURE.

At 304, the chipset type and/or version of HPUEs 102 and/or LPUEs 104 may be associated with a UE and/or wireless device power class stored at the AN 106. AN 106 may configure the reported $P_{cmax}$ level(s) or value(s) for HPUEs 102 and/or LPUEs 104 based on the chipset classification (i.e., the determined power class of HPUEs 102 and/or LPUEs 104). For example, HPUE 102 may be configured with a chipset type "A," which chipset type "A" is provided by HPUE 102 at AN 106 during an ATTACH PROCEDURE. On receipt of the chipset type "A" of HPUE 102, AN 106 can determine a power class of HPUE 102, for example, HPUE 102 may be a power class 2 UE and/or wireless device; LPUE 104 may be configured with a chipset type "B," which chipset type "B" is provided by LPUE 104 at AN 106 during an ATTACH PROCEDURE. On receipt of the chipset type "B" of LPUE 104, AN 106 can determine a power class of LPUE 104, for example, LPUE 104 may be a power class 3 UE and/or wireless device.

At 306, AN 106 may detect a power mismatch between HPUE 102 and LPUE 104; based on the detected power mismatch, AN 106 may artificially limit the $P_{cmax}$ value for HPUE 102 by applying an offset (e.g., 3 dB) to the $P_{cmax}$ value of +26 dBm to compensate for the power mismatch between HPUE 102 and LPUEs 104.

Figure 4:
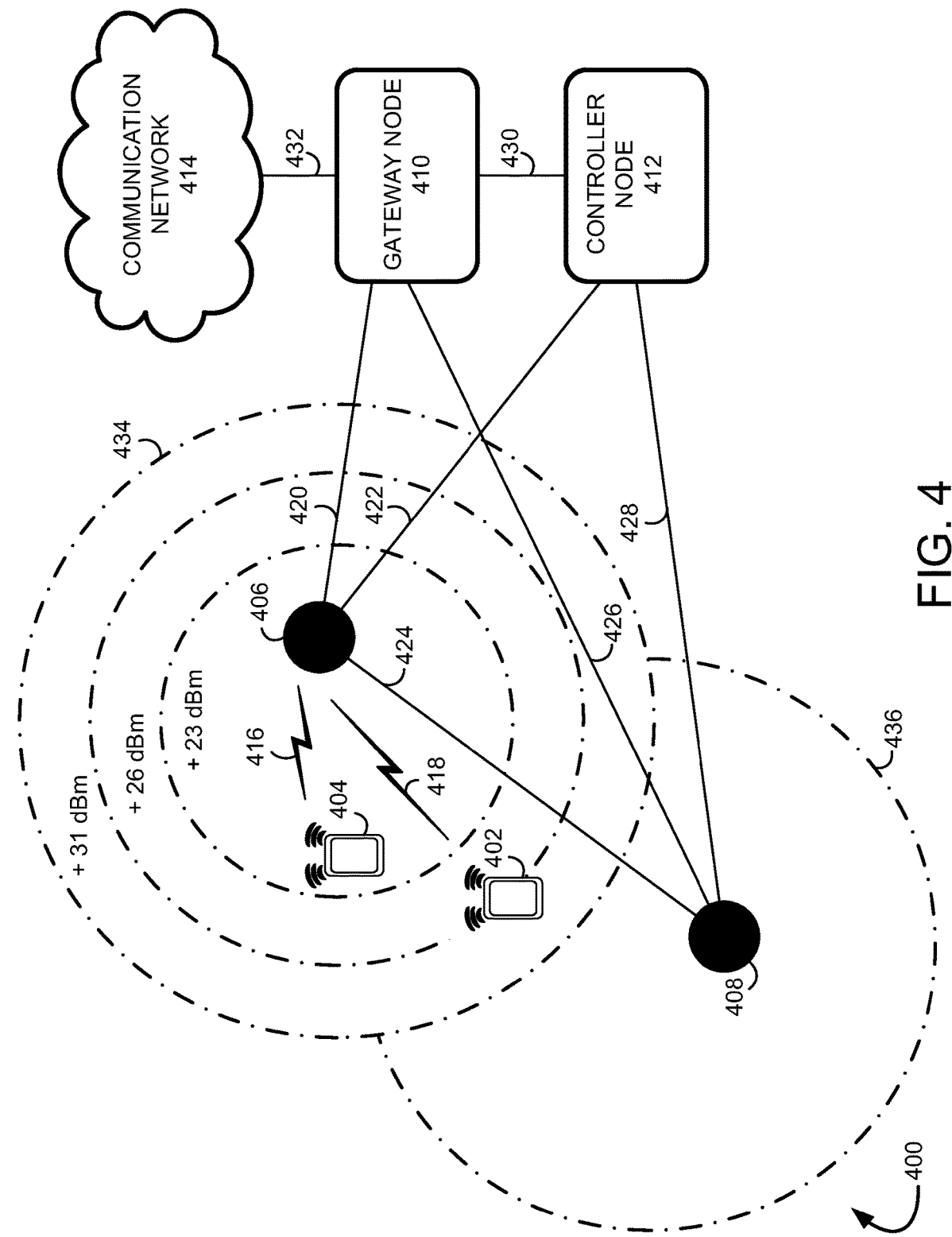
FIG. 4 illustrates another exemplary communication system for configuring a handover threshold for HPUEs and LPUEs operating in a wireless network based on a determined power mismatch.

FIG. 4 illustrates an exemplary communication system 400 for adjusting a power mismatch between HPUEs and/or LPUEs operating in a wireless network. The system 400 will be discussed with reference to the exemplary communication system 100 illustrated in FIGS. 1A and 1B. System 400 can comprise HPUEs 402 and/or LPUEs 404, ANs 406, 408, gateway node 410, controller node 412, and wireless network 414. ANs 406, 408 can include an inspection module and/or scheduler (not shown). Alternatively, an inspection node and/or scheduler (not shown) can be included in the backhaul of system 400. The communications between HPUEs 402 and/or LPUEs 404 and ANs 406, 408 can be relayed, monitored, inspected, and/or scheduled by the inspection module (or node) and/or scheduler (or node).

Other network elements may be present in the communication system 400 to facilitate communication but are omitted for clarity, such as base stations, base station controllers, gateways, MSC, DAP, and location registers such as a HLR or VLR. Furthermore, other network elements may be present to facilitate communication between ANs 406, 408 and wireless network 414, which are omitted for clarity, including additional processing nodes, routers, gateways, and physical and/or wireless data links for carrying data among the various network elements.

HPUEs 402 and/or LPUEs 404 can be UEs and/or wireless devices, which can be any device configured to communicate over system 400 using a wireless interface. For example, HPUEs 402 and/or LPUEs 404 can include a remote terminal unit, a cell phone, a smart phone, a computing platform such as a laptop, palmtop, or a tablet, a PDA, or an internet access device, and combinations thereof. The wireless interface of HPUEs 402 and/or LPUEs 404 can include one or more transceivers for transmitting and receiving data over system 400. Each transceiver can be associated with the same or different frequency bands, the same or different radio access technologies, the same or different network providers, and/or the same or different services. For example, HPUEs 402 and/or LPUEs 404 can include a transceiver that is associated with one or more of the following: CDMA, GSM, WiMAX, LTE, and/or HSDPA, IEEE 802.11, WiFi, Bluetooth, Zigbee, IrDA, MBMS, etc.

HPUEs 402 and/or LPUEs 404 can be configured as different power class UEs and/or wireless devices. For example, HPUEs 402 and/or LPUEs 404 can be configured as high power UEs and/or wireless devices or lower power UEs and/or wireless devices (e.g., as illustrated in Table 1, etc.) and are capable of transmitting at varying $P_{cmax}$ level(s) or value(s) such as, for example, +21 dBm, +23 dBm, +26 dBm, +31 dBm, etc. HPUEs 402 and/or LPUEs 404 can be connected with ANs 406, 408 through communication links 416, 418. Links 416, 418 can use various communication media, such as air, space, metal, optical fiber, or some other signal propagation path—including combinations thereof. Links 416, 418 may comprise many different signals sharing the same link. Links 416, 418 could include multiple signals operating in a single "airpath" comprising beacon signals, user communications, communication sessions, overhead communications, frequencies, timeslots, transportation ports, logical transportation links, network sockets, packets, or communication directions. For example, user communication between HPUEs 402 and/or LPUEs 404 and ANs 406, 408 could share the same representative wireless link, but be transferred over different communication sessions, frequencies, timeslots, packets, ports, sockets, logical transport links, or in different directions—including combinations thereof.

HPUEs 402 and/or LPUEs 404 can transmit and/or receive information over system 400 using various communication services. These services can include various voice, data, and/or MBMS services and applications. For example, mobile voice services, mobile data services, PTT services, internet services, web browsing, email, pictures, picture messaging, video, video messaging, broadcast video, audio, voicemail, music, MP3's, ring tones, stock tickers, new alerts, etc.

ANs 406, 408 can be any network node configured to provide communication between HPUEs 402 and/or LPUEs 404 and wireless network 414. ANs 406, 408 can be short-range ANs or standard ANs. A short-range AN could include a microcell base station, a picocell base station, a femtocell base station, a Remote Radio Head (RRH), relay node, or other low power AN; a standard AN could include a base transceiver station, a radio base station, an eNodeB device, or an enhanced eNodeB device, a Donor eNodeB or the like. ANs 406, 408 can communicate scheduling decisions (e.g., DL scheduling assignments) to HPUEs 402 and/or LPUEs 404 using DCI carried by a PDCCH. The DCI DL scheduling assignments may include, for example, PDSCH resource indication, a transport format, hybrid-ARQ information, control information (e.g., related to multiplexing), command for power control of the PUCCH, uplink scheduling grants, PUSCH resource indication, transport format (e.g., an index of MCS, which may be QPSK, QAM16, QAM64, etc.), etc.

ANs 406, 408 can comprise a processor and associated circuitry to execute or direct the execution of computer-readable instructions to obtain information. ANs 406, 408 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. ANs 406, 408 can receive instructions and other input at a user interface.

Gateway 410 can be any network node configured to interface with other network nodes using various protocols. Gateway 410 can communicate user data over system 400. Gateway 410 can be a standalone computing device, computing system, or network component, and can be accessible, for example, by a wired or wireless connection, or through an indirect connection such as through a computer network or communication network. For example, gateway 410 can include a Serving Gateway (SGW) and/or a Packet Data Network Gateway (PGW), etc. One of ordinary skill in the art would recognize that gateway 410 is not limited to any specific technology architecture, such as LTE and can be used with any network architecture and/or protocol.

Gateway 410 can comprise a processor and associated circuitry to execute or direct the execution of computer-readable instructions to obtain information. Gateway 410 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway 410 can receive instructions and other input at a user interface.

Controller node 412 can be any network node configured to communicate information and/or control information over system 400. Controller node 412 can be configured to transmit control information associated with a handover procedure. Controller node 412 can be a standalone computing device, computing system, or network component, and can be accessible, for example, by a wired or wireless connection, or through an indirect connection such as through a computer network or communication network. For example, controller node 412 can include a MME, a HSS, a PCRF, an AAA node, a RMS, a SPS, a policy server, etc. One of ordinary skill in the art would recognize that controller node 412 is not limited to any specific technology architecture, such as LTE and can be used with any network architecture and/or protocol.

Controller node 412 can comprise a processor and associated circuitry to execute or direct the execution of computer-readable instructions to obtain information. Controller node 412 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 412 can receive instructions and other input at a user interface.

AN 406 can be in communication with AN 408 through communication link 424. AN 406 can be in communication with gateway node 410 through communication link 420 and with controller node 412 through communication link 422. AN 408 can be in communication with gateway node 410 through communication link 426 and with controller node 412 through communication link 428. Gateway node 410 can be in communication with controller node 412 through communication link 430 and with wireless network 414 through communication link 432. Links 420, 422, 424, 426, 428, 430, 432 can be wired or wireless and use various communication protocols such as Internet, IP, LAN, optical networking, HFC, telephony, Ti, or some other communication format—including combinations, improvements, or variations thereof. Links 420, 422, 424, 426, 428, 430, 432 can be a radio frequency, microwave, infrared, or other similar signal, and can use a suitable communication protocol, for example, GSM, CDMA, WiMAX, or LTE, or combinations thereof. Other wireless protocols can also be used. Links 420, 422, 424, 426, 428, 430, 432 can be a direct link or might include various equipment, intermediate components, systems, and networks.

Wireless (or communication) network 414 can be a wired and/or wireless communication network, and can comprise processing nodes, routers, gateways, and physical and/or wireless data links for carrying data among various network elements, including combinations thereof, and can include a LAN or WAN, and an internetwork (including the internet). Wireless network 414 can be capable of carrying data, for example, to support voice, PTT, broadcast video, and data communications by a wireless device such as HPUEs 402 and/or LPUEs 404. Wireless network protocols can comprise MBMS, CDMA 1xRTT, GSM, UMTS, HSPA, EV-DO, EV-DO rev. A, 3GPP LTE, and WiMAX. Wired network protocols that may be utilized by wireless network 414 comprise Ethernet, Fast Ethernet, Gigabit Ethernet, Local Talk (such as Carrier Sense Multiple Access with Collision Avoidance), Token Ring, FDDI, ATM. Wireless network 414 can also comprise additional base stations, controller nodes, telephony switches, internet routers, network gateways, computer systems, communication links, or some other type of communication equipment, and combinations thereof.

Figure 5:
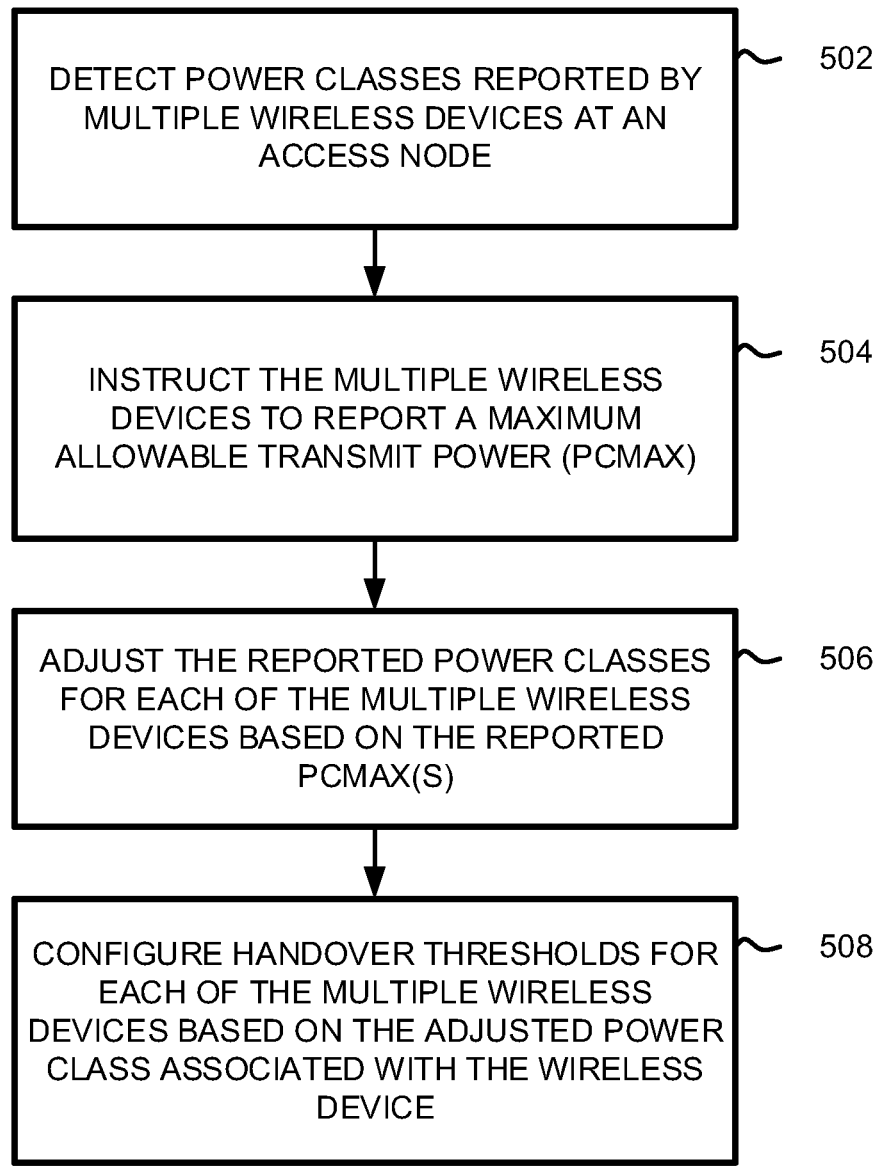
FIG. 5 illustrates a flow chart of an exemplary method for extending a handoff trigger point for HPUEs and/or LPUEs operating in a wireless network.

FIG. 5 illustrates a flow chart of an exemplary method for extending a handoff trigger point for HPUEs and/or LPUEs operating in a wireless network. The method of FIG. 5 will be discussed with reference to the exemplary system 400 illustrated in FIG. 4 and the exemplary coverage range(s) of HPUEs and LPUEs illustrated in FIG. 1B. But, the method for extending a handoff trigger point for HPUEs and/or LPUEs illustrated in FIG. 5 can be implemented with any suitable communication system. In addition, although FIG. 5 depicts steps performed in a particular order for purposes of illustration and discussion, the method discussed herein is not limited to any particular order or arrangement. One skilled in the art, using the disclosure provided herein, will appreciate that various steps of the method can be omitted, rearranged, combined, and/or adapted in various ways.

UEs and/or wireless devices are configured such that they operate in a connected mode within a radio range of AN(s). LPUEs are currently capable of transmitting at $P_{cmax}$ level(s) or value(s) of +23 dBm; HPUEs that transmit at $P_{cmax}$ level(s) or value(s) of +31 dBm have been proposed to boost coverage in rural deployments and to enhance throughput in suburban/urban environments. But, when HPUEs are deployed in areas with an AN density designed for LPUEs, there are certain UL interference concerns. To counteract power mismatches between HPUEs and LPUEs (e.g., which may degrade UL system performance for the LPUEs), ANs may assign (or configure) HPUEs with $P_{cmax}$ level(s) or value(s) that are artificially limited to predefined level (e.g., +24 dBm), which is below a maximum capability of the HPUE hardware (i.e., $P_{max}$). For example, as illustrated in Table 1 above, $P_{cmax}$ level(s) or value(s) and tolerances (i.e., power error limits) with which HPUEs and/or LPUEs can physically transmit data on a given operating band (e.g., Bands I-III) are specified based on defined UE and/or wireless device power classes rather than on actual $P_{cmax}$ level(s) or value(s) of the HPUE and/or LPUE.

Referring to FIG. 5, at 502, AN 406 detects power classes of wireless devices and/or UEs operating within a radio range 434 of AN 406. For example, HPUEs 402 and/or LPUEs 404 operating within a radio range 434 of AN 406 can report UE and/or wireless device power classes in a UE CAPABILITY message at AN 406; AN 406 may configure $P_{cmax}$ level(s) or value(s) for HPUEs 402 and/or LPUEs 404 based on negative power error limits (or tolerances) associated with the UE and/or wireless device power class of the HPUEs 402 and/or LPUEs 404 reported at AN 406. AN 406 may use the configured $P_{cmax}$ level(s) or value(s) to set handover thresholds for HPUEs 402 and/or LPUEs 404.

For example, HPUE 402 can use a UE CAPABILITY message to indicate (or report) at AN 406 that HPUE 402 is a power class 2 UE and/or wireless device that corresponds to a $P_{cmax}$ level of +26 dBm (illustrated in Table 1) with a nominal power tolerance (i.e., power error limit) of ±2 dB (e.g., for E-UTRA bands). AN 406 uses the negative power error limit (e.g., −2 dB) associated with power class 2 UEs and/or wireless devices to configure a handover threshold for HPUE 402 at +24 dBm; Because the handover threshold for HPUE 402 is configured based on the negative power error limit of −2 dB, HPUE 402 may reach an artificial $P_{cmax}$ level before necessary from a range extension perspective.

LPUE 404 uses a UE CAPABILITY message to indicate (or report) its power class at AN 406. For example, LPUE 404 may indicate (or report) that it is a power class 3 UE and/or wireless device at AN 406; Power class 3 UEs and/or wireless devices may correspond to a $P_{cmax}$ level of +23 dBm (illustrated in Table 1) with a nominal power tolerance of ±2 dB. AN 406 uses the negative power error limit (e.g., −2 dB) associated with power class 3 UEs and/or wireless devices to configure a handover threshold for LPUE 404 at +21 dBm; Because the handover threshold for LPUE 404 is configured based on the negative power error limit of −2 dB, LPUE 404 may reach an artificial $P_{cmax}$ level before necessary from a range extension perspective.

Because AN 406 defines $P_{cmax}$ level(s) or value(s) for HPUEs 402 and/or LPUEs 404 based on the indicated (or reported) UE and/or wireless device power class, the defined $P_{cmax}$ level(s) or value(s) are often artificially limited to predefined levels below a maximum capability of the HPUE 402 and/or LPUE 404 hardware, $P_{max}$. Consequently, HPUEs 402 and/or LPUEs 404 operating within the radio range 434 of AN 406 reach $P_{cmax}$ level(s) or value(s) before necessary from a range extension perspective.

At 504, AN 406 instructs the multiple UEs and/or wireless devices configured as HPUEs 402 and/or LPUEs 404 and operating within a radio range 434 of AN 406 to report an actual $P_{cmax}$ level(s) or value(s) at AN 406. For example, in an exemplary embodiment, HPUE 402 and/or LPUE 404 can collect (or detect) data associated with an actual $P_{cmax}$ level(s) or value(s) of HPUE 402 and/or LPUE 404 at, for example, a processing node of HPUE 402 and/or LPUE 404. HPUE 402 and/or LPUE 404 can report the collected (or detected) actual $P_{cmax}$ level(s) or value(s) at AN 406 via a PHR and/or ePHR message or a UE CAPABILITY message.

For example, HPUE 402 may be classified as a power class 2 UE and/or wireless device; the $P_{cmax}$ level(s) or value(s) for HPUE 402 may be artificially limited to +24 dBm (e.g., power class 2 UEs and/or wireless devices have a defined $P_{cmax}$ level or value of +26 dBm, which $P_{cmax}$ level or value is configured based on a negative power error limit of −2 dB). Instead of (or in addition to) reporting its UE and/or wireless device power class at AN 406, HPUE 402 can be configured (or instructed) to report its actual $P_{cmax}$ level(s) or value(s) of, for example, +25 dBm, at AN 406. LPUE 404 may be classified as a power class 3 UE and/or wireless device; the $P_{cmax}$ level(s) or value(s) for LPUE 404 can be artificially limited to +21 dBm (e.g., power class 3 UEs and/or wireless devices have a defined $P_{cmax}$ level or value of +23 dBm, which $P_{cmax}$ level or value is configured based on a negative power error limit of −2 dB). Instead of (or in addition to) reporting its UE and/or wireless device power class at AN 406, LPUE 404 can be configured (or instructed) to report its actual $P_{cmax}$ level(s) or value(s) of, for example, +24 dBm, at AN 406. Thus, AN 406 can include a mix of HPUEs 402 and/or LPUEs 404 with actual $P_{cmax}$ level(s) or value(s) of, for example, +21 dBm to +28 dBm (e.g., assuming AN 406 is serving power class 2 and 3 UEs and/or wireless devices).

At 506, AN 406 can re-classify HPUEs 402 and/or LPUEs 404 based on the actual $P_{cmax}$ level(s) or value(s) reported at AN 406. For example, in an exemplary embodiment, AN 406 can distinguish (or re-classify) HPUEs 402 and/or LPUEs 404 into different pre-defined UE and/or wireless device power classes (e.g., +21-23 dBm, +24-26 dBm, and/or +27-28 dBm UEs and/or wireless devices, etc.) based on the actual $P_{cmax}$ level(s) or value(s) reported by HPUEs 402 and/or LPUEs 404 at AN 406.

At 508, AN 406 re-configures handover thresholds for the HPUEs 402 and/or LPUEs 404 based on the re-classified (or pre-defined) UE and/or wireless device power classes based on the classification category (e.g., +21-23 dBm, +24-26 dBm, and/or +27-28 dBm UEs and/or wireless devices, etc.) of HPUE 402 and/or LPUE 404. For example, HPUE 402 and/or LPUE 404 reporting actual $P_{cmax}$ level(s) or value(s) of +25 dBm and +24 dBm, respectively, can both be re-classified in the pre-defined category of +24-26 dBm UEs and/or wireless devices. AN 406 may re-configure handover thresholds for HPUE 402 and LPUE 404 based on the pre-defined category of +24-26 dBm UEs and/or wireless devices rather than the defined power class (and negative tolerance) associated with the power class of HPUE 402 and/or LPUE 404.

One skilled in the art, using the disclosure provided herein, will appreciate that various steps of the methods can be omitted, rearranged, combined and/or adapted in various ways and can be completed by multiple UEs and/or wireless devices and ANs, for example between HPUEs 402 and/or LPUEs 404.

Figure 6:
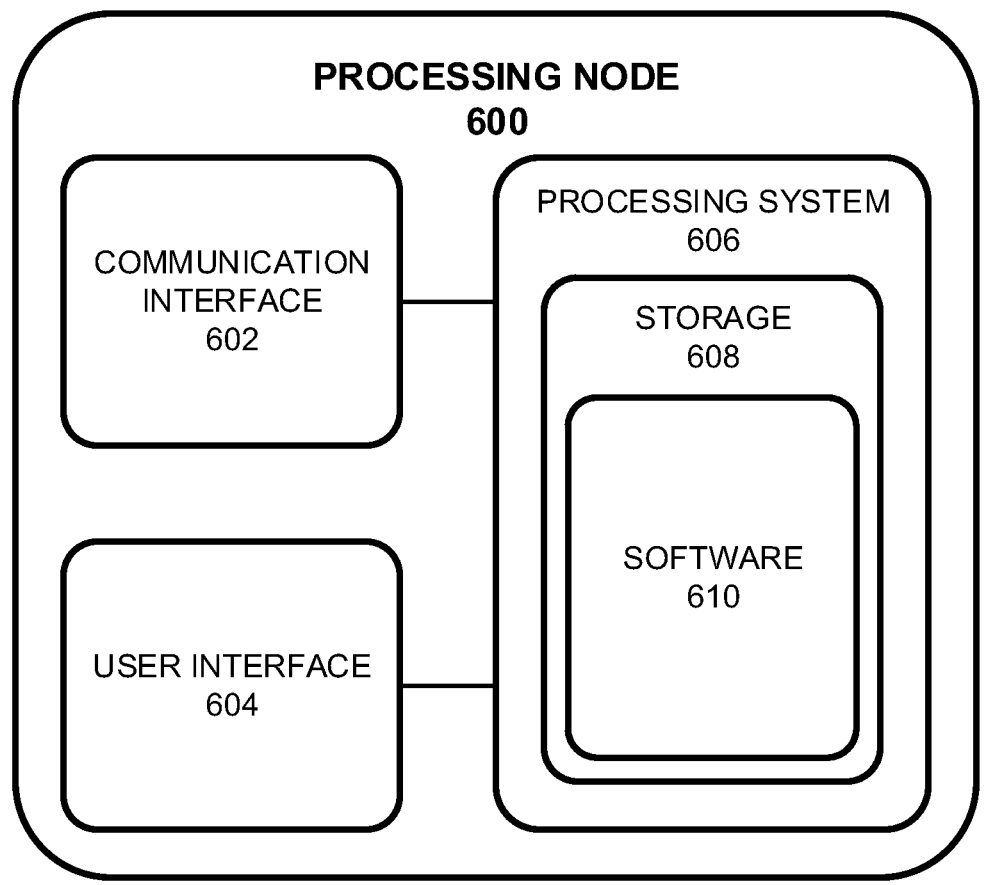
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to determine a communication access node for a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include ANs 106, 106A, 106B, 406, 408, network node 110, gateway node 410, and controller node 412. Processing node 600 can also be an adjunct or component of a network element, such as an element ANs 106, 106A, 106B, 406, 408, network node 110, gateway node 410, and controller node 412. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and nonremovable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for configuring handover thresholds for a plurality of wireless devices in a wireless network, each of the plurality of wireless devices belonging to a power class, the method comprising:
   instructing, by an access node, each of the plurality of wireless devices operating in a radio range of the access node to report a collected maximum transmit power capability at the access node, wherein the collected maximum transmit power for each wireless device represents a hardware capability of each wireless device;
   classifying the plurality of wireless devices into one of multiple predefined categories based on the reported collected maximum transmit power capability received from each of the plurality of wireless devices rather than the power class, wherein multiple wireless devices belonging to different power classes are classified into a same predefined category; and
   configuring handover thresholds for the plurality of wireless devices based on the classification.

2. The method of claim 1, wherein each of the plurality of wireless devices is configured as one of a high power wireless device (HPUE) and a low power wireless device (LPUE).

3. The method of claim 2, wherein each of the HPUEs and LPUEs reports the power class at the access node via a capability message.

4. The method of claim 2, wherein one or more of the HPUEs and LPUEs are classified in the same predefined category.

5. The method of claim 4, wherein the predefined categories are based on the reported collected maximum transmit power values received from the plurality of wireless devices.

6. A system for configuring handover thresholds for a plurality of wireless devices in a wireless network, each of the plurality of wireless devices belonging to a power class, the system comprising:
   a processing node configured to:
      instruct each of the plurality of wireless devices operating in a radio range of an access node to report a collected maximum transmit power capability at the access node, wherein the collected maximum transmit power for each wireless device represents a hardware capability of each wireless device;
      classify the plurality of wireless devices into one of multiple predefined categories based on the reported collected maximum transmit power value received from the plurality of wireless devices rather than the power class, wherein multiple wireless devices belonging to different power classes are classified into a same predefined category; and
      configure handover thresholds for the plurality of wireless devices based on the classification.

7. The system of claim 6, wherein each of the plurality of wireless devices is configured as one of a high power wireless device (HPUE) and a low power wireless device (LPUE).

8. The system of claim 7, wherein each of the HPUEs and LPUEs reports the power class at the access node via a capability message.

9. The system of claim 7, wherein one or more of the HPUEs and LPUEs are classified in the same predefined category.

10. The system of claim 9, wherein the predefined categories are based on the reported collected maximum transmit power capability of each wireless device of the plurality of wireless devices.

11. A method for adjusting a power mismatch between wireless devices, each of the wireless devices belonging to a power class, the method comprising:
   detecting, at an access node, the power classes reported by multiple wireless devices operating in a radio range of the access node;
   instructing, by the access node, each of the multiple wireless devices to report a collected maximum output power capability, wherein the collected maximum output power capability for each wireless device represents a hardware capability of each wireless device;
   reclassifying, at the access node, the wireless devices into one of multiple predefined categories based on the reported collected maximum output power capability, wherein multiple wireless devices belonging to different power classes are reclassified in a same predefined category; and
   configuring handover thresholds for each of the multiple wireless devices based on the reclassification resulting from the reported collected maximum output power capability.

12. The method of claim 11, wherein the power classes reported by the multiple wireless devices indicate that the wireless device is configured as a higher power class wireless device (HPUE) or a lower power class wireless device (LPUE).

13. The method of claim 12, wherein the reported collected maximum output power capability reported by each of the multiple wireless devices exceeds a maximum allowable transmit power level set at the access node.

14. The method of claim 13, wherein the maximum allowable transmit power level is set based on a reported power class of the HPUE and/or LPUE.

15. The method of claim 11, wherein the reported collected maximum output power capability of the multiple wireless devices reported at the access node is determined based on a chipset type or version of the wireless device.

16. The method of claim 15, wherein the multiple wireless devices are reclassified into one of the predefined categories based on the chipset type or version of the wireless device.

* * * * *